UNITED STATES PATENT OFFICE.

JOSEPH GREENBERG, OF PHILADELPHIA, PENNSYLVANIA.

DRY COFFEE COMPOUND.

1,381,821. Specification of Letters Patent. Patented June 14, 1921.

No Drawing. Application filed April 12, 1920. Serial No. 373,377.

*To all whom it may concern:*

Be it known that I, JOSEPH GREENBERG, a citizen of the United States, residing at Philadelphia, in the county of Philadelphia and State of Pennsylvania, have invented a certain new and useful Dry Coffee Compound, of which the following is a specification.

My invention relates to coffee compounds which are intended as the basis for the quick preparation of coffee by addition of hot water only. They may be marketed in powdered form, in tablets, or even in a thick mixture or paste and contain the milk for the coffee and the sugar if desired.

The purpose of my invention is to make mixtures of this character more nearly resemble normal prepared coffee.

A further purpose is to remove those constituents from the milk portion of the mixture which are not wholly soluble in water.

A further purpose is to render the solution completely and immediately soluble in the water.

I prefer to illustrate my invention by but two forms, though I recognize that many other ingredients may be added to my mixture, without departing from the spirit and scope of my invention but with the purpose of securing the advantage of the special characteristics of the ingredients added or to suit the whim of the maker or to identify the product.

In the manufacture of coffee mixtures it has been customary to use milk containing a large part of its original cream content, with the result that the drying process so affects the emulsion in which the fat exists in the milk that upon the addition of water these fat particles combine in the presence of or with the proteids of the milk to produce larger particles than in their original homogeneous state. These larger particles are easily noticeable by the human eye.

It is probable that the contrast is increased by each particle of fat forming a nucleus about which particles of casein are accumulated, forming a larger white mass, much as mineral matter is collected by oil-filmed bubbles of air in the separation of mineral matter from ore.

These larger particles are formed also when dried milk is dissolved in hot water but this is not objectionable in the latter case because the white body of the milk prevents the individual enlarged white particles from being noticeable in the fine white flocculent particles of casein which form the proteid element of the milk and cause its white appearance.

However, in a coffee extract mixture which has been dissolved in hot water the dark color of the mixture causes the white particles to stand out in marked contrast, giving an appearance resembling that which results when sour milk has been used in coffee. Though such a mixture when dissolved is probably quite easily digested, this white flecking of the surface is most objectionable to users, with the result that mixtures of this character have not appealed to a discriminating public interfering seriously with the commercial introduction of the product.

The attempt to use malted milk has offered no relief from this objection as the same character of white particles appear and there is also an objectionable taste.

I have discovered that the substantial elimination of the fat from the milk relieves this objectionable white specking of the ultimate drink without interfering seriously with the flavoring effect of the milk.

Good American milk contains from 3.25% to 6% of fat with an average of about 3.9%. In the dried product, upon the basis of 12% solids this means approximately 31% of fat. Baby, invalid and other dry modified milks contain less than this amount because it is claimed by their makers that special milks containing about half the fat ordinarily found in dried milk, are more readily digested.

My experiments have indicated that the limit at which the white particles cease to be objectionable in the finished coffee drink is about 4 or 5% of fat in the dry milk.

Where sugar is included in the mixture the milk represents from one-third to one-half of the complete dry mixture, preferably about 40% which would reduce the percentage of permissible milk fat in the mixture to from 2% to 3%. Where sugar is not included in the product the milk preferably forms about 65% of the dry mixture, bringing the permissible fat up to say 3% of the total. A very excellent mixture can be made with a milk as nearly fat free as it can be separated in commercial practice.

A percentage below 4% of fat in the dry milk (*i. e.*, before mixing with the coffee) can be reached easily by centrifugal fat separation and very much lower percentages of fat can be obtained commercially by this means.

I find that a very good percentage of mixture is obtained with 40% of substantially fat free milk, 22% of coffee extract and 38% sugar and that the color is improved and, for some tastes the flavor is improved by the use of chicory extract either in place of part of the coffee extract or additional thereto.

Coffee contains a considerable percentage of insoluble fibrous matter. In my reference to coffee extract, I mean an extract made by decanting off the soluble matter from this insoluble fibrous base, whether the caffein be retained or not, and suitably concentrating the decanted liquor.

As the remaining nitrogenous, sugar and mineral parts of the whole milk, in my mixture still form a valuable food and a coffee made with this milk would be more digestible than that made with fresh milk, the slight decrease in food value is more than offset by the change of appearance secured.

My mixture will also keep a much longer time and stand much more exposure to air than a dry mixture made from the original milk (i. e., of milk unmodified in this respect) or from malted milk, as their high fat content causes them to become rancid much more quickly than my more stable coffee mixture.

It is my purpose to protect the mixture of coffee extract and milk of low fat content described herein whether it be made with or without sugar and, in either case, with or without chicory as the taste and policy dictate. However, the addition of sugar has an advantage in preserving the milk and coffee mixture.

I find that the sweetening can be obtained by the use of sweet binding material instead of all or part of the sugar, using the binding material to hold the mixture together in the form of tablets or triturates. To secure this advantage the sweetening material must be put in after drying.

In preparation the coffee extract, milk and sugar or chicory extract, if used, or both, may be dried separately and then mixed or the drink may be prepared with the desired ingredients in it and the entire mixture or any two of the ingredients may be dried together.

My invention is also independent of the means used in effecting the drying which can be done by spraying into a vacuum or by any other available means.

It will be further evident that the value of my mixtures will not be affected by the addition of any flavoring or coloring matters which the preference of the individual may dictate.

Having thus described my invention, what I claim as new and desire to secure by Letters Patent is:—

1. A dry coffee mixture comprising coffee extract, a sweetening ingredient and milk having a fat content greatly reduced as compared with unmodified dry milk.

2. A dry coffee mixture comprising dry coffee extract, and dry milk having a fat content greatly reduced as compared with unmodified dry milk.

3. A dry coffee mixture comprising coffee extract, a sweetening ingredient and milk having a milk fat content of not more than 3% of the entire mixture.

4. A dry coffee mixture containing coffee extract and milk, the milk fat content of the mixture being less than 3%.

5. A dry coffee mixture containing a total of less than 3% milk fat, comprising coffee extract and milk, sugar and a sweetening binding material holding them together.

JOSEPH GREENBERG.